United States Patent [19]

Yamauchi

[11] Patent Number: 5,099,609

[45] Date of Patent: Mar. 31, 1992

[54] SELF-WATERING CERAMIC PLANTER

[75] Inventor: Yami Yamauchi, Long Beach, Calif.

[73] Assignee: Ceramic Creations, Cudahy, Calif.

[21] Appl. No.: 648,583

[22] Filed: Jan. 31, 1991

[51] Int. Cl.$^5$ ............................................. A01G 27/00
[52] U.S. Cl. ............................................. 47/81; 47/79
[58] Field of Search ........................................ 47/81, 79

[56] References Cited

U.S. PATENT DOCUMENTS

| | | | |
|---|---|---|---|
| 1,264,096 | 4/1918 | Lelievre | 47/81 |
| 2,554,302 | 5/1951 | Keskitalo | 47/81 |
| 3,786,598 | 1/1974 | Stadelhofer | 47/81 |
| 4,299,054 | 11/1981 | Ware | 47/81 |
| 4,324,070 | 4/1982 | Swisher | 47/81 |
| 4,343,109 | 8/1982 | Holtkamp | 47/81 |

FOREIGN PATENT DOCUMENTS 465067  8/1951  Italy .................................... 47/81

*Primary Examiner*—Richard E. Chilcot, Jr.
*Assistant Examiner*—Joanne C. Downs
*Attorney, Agent, or Firm*—Daniel L. Dawes

[57] ABSTRACT

A self-watering system provides water through capillary action across drainage holes in the bottom of a common pot without intrusion of any wicking material into the pot or necessity for transplanting the plant from the common pot in which it was commercially vended. The common pot is placed upon a felt wick pad which substantially covers the entire surface of the bottom of the common pot. The felt pad in turn is placed on a ceramic, porous base, which serves as a wick, which supports the felt pad, and which defines a water reservoir beneath a common pot. The common pot together with the felt pad and ceramic support are placed within a decorative pot with the water reservoir defined between the decorative pot and the ceramic support. The ceramic support is made of a fired mixture of talc, Tennessee #1 clay, OM #4 clay, P-V #1 clay, Pyrex and sand.

9 Claims, 1 Drawing Sheet

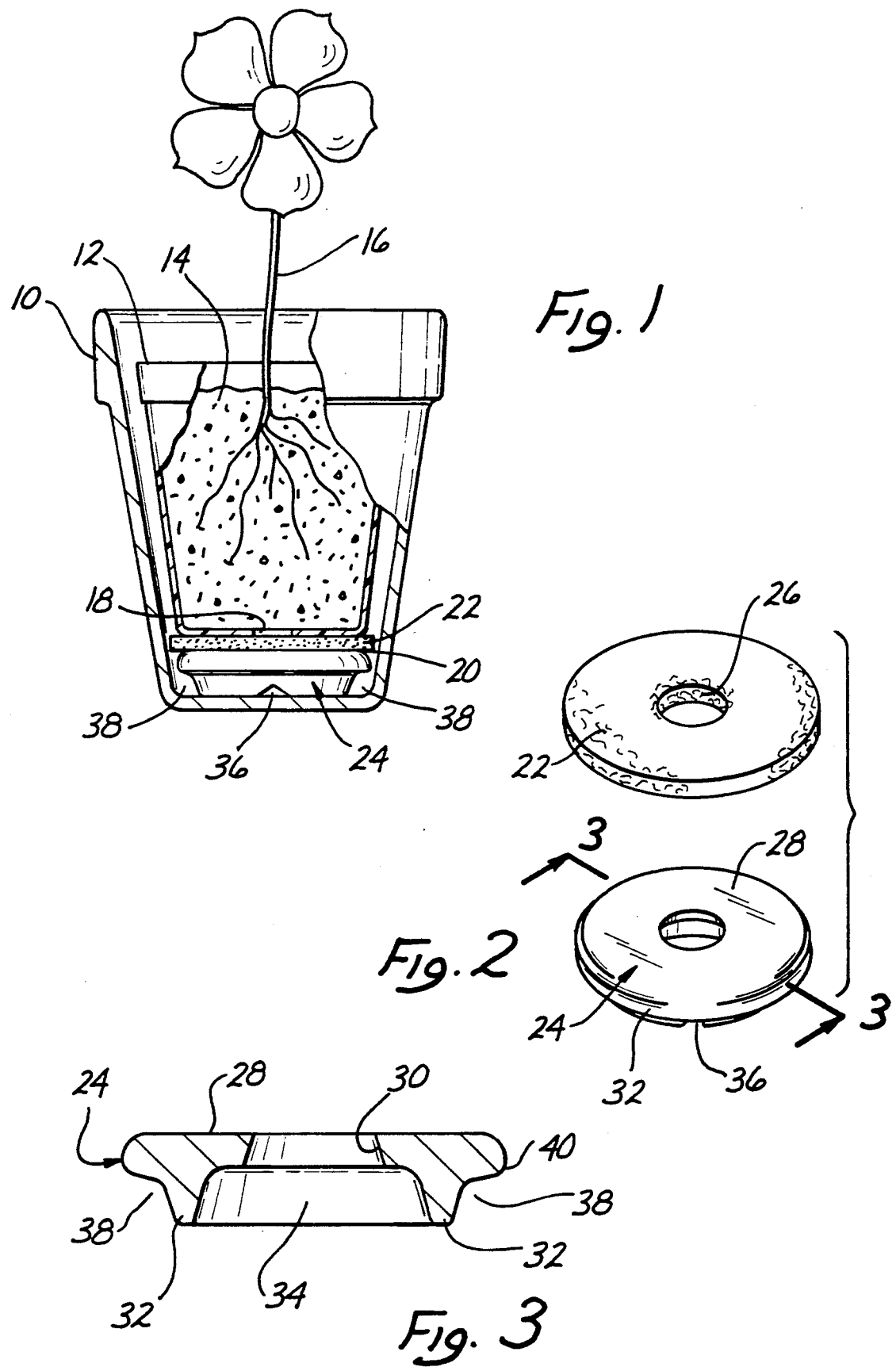

SELF-WATERING CERAMIC PLANTER

BACKGROUND OF THE INVENTION

1. Field of the Invention

The invention relates to a capillary device for watering a potted plant, and more particularly to a ceramic disc and wick adapted to be used with a plastic or impervious flower pot to improve the transfer of water from a tray or decorative holding pot into the growing medium of the flower pot by means of capillary action.

2. Description of the Prior Art

The use of various types of wicking devices and capillary action in order to draw liquid into the soil within a potted plant is well known. Typical examples of such wicks are shown by Sorenson, "Plant Growing and Display Assembly," U.S. Pat. No. 4,236,353 (1980); Magid, "Flower Pot and Jacket For Same," U.S. Pat. No. 2,810,235 (1957); Schein, "Flowerpot Watering System", U.S. Pat. No. 2,072,185 (1937); Centafanti, "Self-Watering Flower Pot," U.S. Pat. No. 4,829,709 (1989); Patterson et al, "Osmotic Fiber Systems," U.S. Pat. No. 4,805,343 (1989); and Barstow, "Vase Adapter for Flowerpots," U.S. Pat. No. 2,695,474 (1954). Each of these prior art systems involves some type of a cord, rope or wicking material having one end disposed in a water reservoir and the other end disposed through drain holes provided in the bottom of the flower pot, which is held or contained in some fashion in relationship to the reservoir.

The use of ceramics as wicking material to draw from a reservoir into the bottom of a pot is shown in several embodiments by Richards, "Auto Irrigation System," U.S. Pat. No. 2,084,005 (1937). However, in Richards the ceramic or porous clay material through which the water is drawn by capillary action into the soil surrounding the roots of the plant require an intimate and direct contact between the ceramic material and the soil. Therefore, a portion of the pot containing the soil must be made from the porous ceramic material or contiguous with some type of porous ceramic element that fits into the flower pot and extends therefrom into a reservoir.

The use of a wicking pad underlying the flower pot, but not extending physically into the flower pot is shown by Holtkamp, "Capillary Disc and Support Therefor," U.S. Pat. No. 4,343,109 (1982). However, Holtkamp requires a portion of the felt pad to be cut and extended downwardly into a reservoir in order to provide a capillary or wicking action into the pad. The pad itself rests upon a plastic stand supported above the water tray reservoir. The plastic support in turn is supported by a tripod of three thin plastic legs which can easily be broken off in handling and which do not contribute to the capillary watering.

What is needed is a rugged, inexpensive and simple watering system which can be used inside a decorative flower pot for self-watering a standard commercial flower pot having drain holes defined in the bottom, but without the requirement of having wicking material extending through the drain holes into the standard flower pot. A self-watering system is needed wherein the plant may be self-watered without the need for transplanting it into a specially designed container. The self-watering system should also be adaptable to easy decorative changes so that the display of the potted plant can be changed according to changing interior design needs.

BRIEF SUMMARY OF THE INVENTION

The invention is a system for self-watering a plant contained within a common pot having at least one drainage hole defined through a bottom surface of the common pot. The invention comprises a felt pad for providing a wicking surface for contact with a substantial portion of the bottom surface of the common pot. A ceramic wick is provided to support the pad, to define a reservoir for water, and to provide a wick from the reservoir to the felt pad. As a result, the felt pad is kept sufficiently moist to allow capillary action of water across the wicking surface of the felt pad into the common pot without intrusion of any portion of the system into the common pot.

The system further comprises a decorative pot for containing the common pot, felt pad and ceramic wick. The decorative pot hides the common pot from view.

The felt pad entirely covers the bottom of the common pot. The ceramic wick provides a supporting wicking surface in contact with a substantial portion of the felt pad. The ceramic wick is characterized by a circumferential supporting rim. The circumferential supporting rim defines an interior reservoir beneath the ceramic wick and provides wicking action at all levels within the reservoir to the felt pad. The circumferential supporting rim defines an exterior reservoir between itself and the decorative pot. A notch is defined in the circumferential supporting rim to permit fluidic communication between the exterior reservoir and the interior reservoir. The felt pad and ceramic wick have a bore defined therethrough to permit inspection of the interior reservoir. The bore is sized to permit manual handling of the felt pad and ceramic wick.

The ceramic wick has a composition comprised of a mixture of talc. Tennessee #1 clay. OM #4 clay. and P—V #1 clay. The ceramic wick may further comprise a mixture of sand and Pyrex. In the illustrated embodiment the mixture is comprised of 46% by volume of talc, 18% by volume of Tennessee #1 clay, 18% by volume of OM #4 clay, and 18% by volume of P—V #1 clay. The ceramic wick is further comprised of additional portions of 15% by volume of the clay mixture of 70 mesh sand and 5% by volume of the clay mixture of the Pyrex. The mixture of talc, clay, sand and Pyrex is fired at approximately 1760 degrees F. for approximately 5 hours.

The invention can also be characterized as a system for self-watering a plant in soil contained in a common pot having a bottom with at least one drainage hole defined therethrough. The system comprises a first element for providing a wicking action through the bottom of the common pot without intrusion of any object into the pot. A second element defines a water reservoir beneath the pot. A third element provides a wicking action from the water reservoir into the first element regardless of water level within the water reservoir. The third element is separate from the first element. As a result, a simple, inexpensive and rugged system for self-watering the plant is provided.

The invention is still further characterized as a method for self-watering a plant in soil contained in a common pot having a bottom with at least one drainage hole defined therethrough comprising the steps of providing a wicking action through the bottom of the common pot without intrusion of any object into the pot. A water reservoir is defined beneath the pot. A wicking action is provided from the water reservoir into the first element regardless of water level within the water reservoir. The third element is separate from the first element. As a result, self-watering the plant in a simple, inexpensive and rugged system is provided.

The invention and its various embodiments can better be visualized by now turning to the following drawings wherein like elements are referenced by like numerals.

BRIEF DESCRIPTION OF THE DRAWINGS

FIG. 1 is a cross-sectional view of the invention shown as utilized within a decorative flower pot.

FIG. 2 is an exploded perspective view of the wicking pad and ceramic wick of the invention.

FIG. 3 is a cross-sectional view of the ceramic wick as seen through section lines 3—3 of FIG. 2.

The invention and its various embodiments are better understood by now turning to the following detailed description.

DETAILED DESCRIPTION OF THE PREFERRED EMBODIMENTS

A self-watering system provides water through capillary action across drainage holes in the bottom of a common pot without intrusion of any wicking material into the pot or necessity for transplanting the plant from the common pot in which it was commercially vended. The common pot is placed upon a felt wick pad which substantially covers the entire surface of the bottom of the common pot. The felt pad in turn is placed on a ceramic, porous base, which serves as a wick, which supports the felt pad, and which defines a water reservoir beneath a common pot. The common pot together with the felt pad and ceramic support are placed within a decorative pot with the water reservoir defined between the decorative pot and the ceramic support. The ceramic support is made of a fired mixture of talc, Tennessee #1 clay, OM #4 clay, P—V #1 clay, Pyrex and sand.

FIG. 1 illustrates the preferred application of the invention wherein a decorative flower pot 10 is used as a container for holding and hiding a standard commercial flower pot 12. For example, pot 12 may typically be a common, low cost, plastic 4" pot commonly used to sell small plants throughout nurseries, grocery stores and other retail outlets. Decorative pot 10 is a more expensive, glazed and colored, or decorative heavy clay or ceramic of sufficient size to allow common pot 12 to be fully disposed inside of it and hidden from view. Common pot 12 serves to hold soil 14 and plant 16 in a conventional manner, and in the preferred embodiment is the pot in which plant 16 is commercially vended. Therefore, there is no need in the use of the present invention to transplant or disturb the contents of pot 12 in any manner.

Pot 12 typically has one or more drainage holes 18 disposed on its bottom surface 20. Pot 12 is placed so that its bottom surface 20 rests on a felt pad 22. Pad 22 in the preferred embodiment is cut to substantially cover the bottom of pot 10 at the elevation at which pad 22 is maintained. Pad 22 is positioned in pot 10 by an underlying porous ceramic wick 24. In the illustrated embodiment, felt pad 22 is a wicking material approximately ⅛" to ¼" thick.

Pad 22 is shown in greater detail in the exploded perspective view of FIG. 2. Again in the illustrated embodiment, pad 22 has a generally circular configuration and is provided with a central access hole 26. Pad 22 is in contact with an upper surface 28 of ceramic wick 24. Ceramic wick 24 also has a central access hole 30 defined therethrough which is aligned with hole 26 when pad 22 is placed upon ceramic wick 24. These holes allow manual manipulation as well as visual access to inspect the level of water in the reservoir defined by the system.

Ceramic wick 24 provides an elevated platform for the support of bottom surface 20 of pot 12 as best illustrated in the cross-sectional view of FIG. 3 taken through sections lines 3—3 of FIG. 2. Surface 28 of ceramic wick 24 is elevated by means of an integral circular supporting rim 32 which serves to define a reservoir cavity 34 underneath surface 28. A notch 36 is defined at one point in rim 32 to allow the free flow of water from the interior reservoir cavity 34 to a circumferential reservoir cavity 38, which is best depicted in FIG. 1 as being defined between the outside rim 32 of ceramic wick 34 and the containing decorative pot 10.

When ceramic wick 32 with felt pad 22 is placed in the bottom of pot 10 as depicted in FIG. 1, aligned access holes 26 and 30 permit visual inspection of the water level within the main and central underlying cavity 34 without removal of the wicking material from the pot simply by lifting pot 12 out of pot 10. Circumferential reservoir 38 is often, is often, if not always, hidden by the overextending circumferential lip 40 of wick 24 and/or pad 22 which may completely fill the bottom of pot 10. In addition, access holes 26 and 30 provide a convenient means for inserting and removing felt pad 22 and ceramic wick 24 by placing the finger within the axial hole and curving the fingertip slightly into reservoir cavity 34 to hook the combination of pad 22 and ceramic wick 24. In the illustrated embodiment, pad 22 is fixed or adhesively bonded to surface 28 of wick 24.

In its intended use, ceramic wick 24 and pad 22 are placed in the bottom of pot 10 and water poured into pot 10 until pad 22 is throughly wetted without necessarily submerging the upper surface of pad 22. Common pot 12 is then simply placed on top of wick 22, which is kept moist by the composition of ceramic wick 24 to a sufficient degree that the water on the top surface of pad 22 is capable of bridging the small air gaps in drainage holes 18 which may exist between soil 14 and the upper surface of pad 22. If pad 22 is too dry, it is possible that insufficient water will be provided at the top of pad 22 to allow a sufficiently strong capillary action through holes 18 into soil 14. Unlike the prior art which in virtually all instances required the wicking material to extend into direct contact with soil 14, direct contact with soil 14 and pad 22 in the present invention might not occur, or if it does occur, may be nominal.

Therefore, it can be readily appreciated based on the teaching of the invention that it is necessary to keep pad 22 at a sufficiently high moisture content. This is achieved in the present invention by having the entire volume of ceramic wick 24 providing a strong wicking action into pad 22. Therefore the composition and manufacture of ceramic wick 24 must be of a nature sufficient to maintain the moisture level within pad 22 to allow the capillary action to jump the air gaps in holes 18.

In the illustrated embodiment, the ceramic of wick 24 is manufactured by thoroughly mixing talc, Tennessee #1 clay, OM #4 clay, and P—V #1 clay. In the preferred embodiment, talc is added to equal parts by volume of Tennessee #1, OM #4 and P—V #1 clay. For example, 40% by volume talc is added to 18% by volume T #1 clay, 18% by volume OM #4 clay, and 18% by volume P—V #1 clay.

Sand and powdered Pyrex are then mixed into the clay and talc mixture. Again in the illustrated embodiment, 70 mesh sand in the proportion of 15% by volume of the clay and talc mixture and 5% by volume Pyrex of the clay and talc mixture are added and thoroughly mixed together. The clay talc, sand and Pyrex mixture is molded to form wick 24 as described above, and then fired at approximately 1760 degrees F. for approximately 5 hours. What results is a highly porous white ceramic with good mechanical properties, which allows it to provide a nonfriable mechanical support for pot 12 and yet provides a strong degree of capillary action to keep felt pad 22 sufficiently wet.

The ceramic wick by its structure defines the water reservoir and forms a continuous wicking medium to the very bottom of the reservoir defined by it to the lowermost extending surface of felt pad 22. Therefore, regardless of how low the water reservoir gets, there is no situation where contact with the ceramic wicking medium into the felt pad is interrupted. Furthermore, the entire volume of ceramic wick 24 provides a wicking action and the entire surface 28 of ceramic wick 24 provides a delivery surface for the water into felt pad 22, which is thus uniformly supplied with water across its entire lowermost surface and not only at a central wicking point such as shown by Richards.

Many modifications/alterations may be made by those having ordinary skill in the art without departing from the spirit and scope of the invention. Therefore, it must be understood that the invention is defined by the following claims and is not to be limited by the illustrated embodiment. The following claims are to be read as including not only what is literally specified, but all means equivalent thereto for performing substantially the same function in substantially the same manner to obtain substantially the same result.

I claim:

1. A system for self-watering a plant contained within a common pot having at least one drainage hole defined through a bottom surface thereof comprising:
   a felt pad for providing a wicking surface for contact with a substantial portion of said bottom surface of said common pot, said felt pad being positioned substantially outside of said common pot;
   a porous ceramic wick for rigidly supporting said pad within said system, for defining a reservoir for water, and for providing a wick from said reservoir to said felt pad, said ceramic wick being positioned outside and below said common pot; and
   a decorative pot for containing said common pot, felt pad and ceramic wick, said decorative pot hiding said common pot from view, said ceramic wick being disposed in said decorative pot, said felt pad being disposed on said ceramic wick, and said common pot being disposed on said felt pad,
   whereby said felt pad is kept sufficiently moist to allow capillary action of water across said wicking surface of said felt pad into said common pot without intrusion of any portion of said system into said common pot.

2. The system of claim 1 wherein a portion of said ceramic wick is characterized by a circumferential supporting ring, said circumferential supporting ring defining an interior reservoir beneath said ceramic wick between said common pot and said ring and providing wicking action at all levels within said reservoir to said felt pad.

3. The system of claim 1 wherein said ceramic wick provides a rigid supporting surface in contact with a substantial portion of said felt pad.

4. The system of claim 3 wherein a portion of said ceramic wick is characterized by a circumferential supporting ring, said circumferential supporting ring defining an interior reservoir beneath said ceramic wick between said common pot and said ring and providing wicking action at all levels within said reservoir to said felt pad.

5. The system of claim 4 wherein said circumferential supporting ring defines an exterior reservoir, circumferential defined outside said ring between said ring and common pot.

6. A system for self-watering a plant contained within a common pot having at least one drainage hole defined through a bottom surface thereof comprising:
   a felt pad for providing a wicking surface for contact with a substantial portion of said bottom surface of said common pot;
   a ceramic wick for supporting said pad, for defining a reservoir for water, and for providing a wick from said reservoir to said felt pad; and
   a decorative pot for containing said common pot, felt pad and ceramic wick, said decorative pot hiding said common pot from view;
   wherein said felt pad entirely covers said bottom of said common pot;
   wherein said ceramic wick provides a supporting wicking surface in contact with a substantial portion of said felt pad;
   wherein a portion of said ceramic wick is characterized by a circumferential supporting ring, said circumferential supporting ring defining an interior reservoir beneath said ceramic wick between said common pot and said ceramic wick and providing wicking action at all levels within said reservoir to said felt pad; and
   wherein said circumferential supporting ring defines an exterior reservoir, circumferential defined outside said ring between said ring and common pot,
   wherein a notch is defined in said circumferential supporting ring permitting fluidic communication between said exterior reservoir and said interior reservoir;
   whereby said felt pad is kept sufficiently moist to allow capillary action of water across said wicking surface of said felt pad into said common pot without intrusion of any portion of said system into said common pot.

7. The system of claim 6 wherein said felt pad and ceramic wick have a bore defined therethrough to permit inspection of said interior reservoir.

8. The system of claim 7 wherein said bore is sized to permit manual handling of said felt pad and ceramic wick.

9. A system for self-watering a plant in soil contained in a common pot having a bottom with at least one drainage hole defined therethrough, said common pot disposed in and hidden from view by a decorative pot, said system comprising:
   first means disposed in said decorative pot for providing a wicking action through said bottom of said common pot without intrusion of any portion of said first means into said common pot;

second means disposed in said decorative pot for defining a water reservoir beneath said common pot in said decorative pot and for rigidly supporting said first means and common pot within said decorative pot; and third means disposed in said decorative pot for providing a wicking action from said water reservoir into said first means regardless of water level within said water reservoir, said third means being separate from said first means and being integral with said second means, whereby a simple, inexpensive and rugged system for self-watering said plant is provided.

* * * * *